United States Patent
Forster et al.

[11] Patent Number: 5,934,062
[45] Date of Patent: Aug. 10, 1999

[54] LINK SHAPE AND CHAIN LINK ASSEMBLY METHOD

[75] Inventors: Barry C. Forster, Mississauga; Jorgen O. Bernt, Oakville, both of Canada

[73] Assignee: J.O. Bernt & Associates Limited, Canada

[21] Appl. No.: 08/907,507

[22] Filed: Aug. 8, 1997

[51] Int. Cl.⁶ .................................................. F16G 15/04
[52] U.S. Cl. ...................................... 59/85; 59/78; 59/84
[58] Field of Search .............................. 59/5, 78, 84, 86, 59/90, 93

[56] References Cited

U.S. PATENT DOCUMENTS

| | | | |
|---|---|---|---|
| 543,087 | 2/1895 | Ferris | 59/86 |
| 1,910,873 | 5/1933 | Zahn . | |
| 3,281,134 | 10/1966 | Feiser . | |
| 4,034,556 | 7/1977 | Riber . | |
| 4,497,169 | 2/1985 | Millington | 59/78 |
| 4,627,232 | 12/1986 | Bruce | 59/78 |
| 5,133,179 | 7/1992 | Bernt . | |

FOREIGN PATENT DOCUMENTS

| | | | |
|---|---|---|---|
| 1104670 | 6/1970 | Japan . | |
| 426235 | 6/1966 | Switzerland | 59/78 |

*Primary Examiner*—David Jones

[57] ABSTRACT

Link for chain having an extent about an aperture defines a section which is wider near the inside with the section being usually concave outward on each side, A junction link comprises a C member and a bridging member with a cross section generally similar to the link. A method of assembling the bridging member to the C member involves providing two pairs of aligned apertures. In each pair a rivet like member with a head end and a free end has its free end inserted through the aligned apertures, after which a head is formed on the free end by arc welding.

10 Claims, 4 Drawing Sheets

LINK SHAPE AND CHAIN LINK ASSEMBLY METHOD

This invention relates to a chain link, primarily designed for heat exchange use in a rotary kiln, to a junction link therefor and to a method of connecting a C shaped main extent and its bridging member for a junction link.

By 'chain link' I include both a continuous link and the junction link which normally joins adjacent pairs of continuous links.

The link in accord with the invention is believed to have better heat exchange qualities for its weight than other available chain designs because of its shape which provides a radially inwardly facing surface and at said surface being relatively thick in axial section and tapering in axial section toward the radially outward end.

The form of the continuous link and for the C shaped major extent of the junction link preferably approximates a surface of revolution. It is therefore convenient to speak of the 'radial' and 'axial' direction in describing the link, terms derived from the surface of revolution.

The link with the thick small radius and a thin large radius tends to provide a link having a large surface area for its weight.

Since the heat exchange value of a kiln chain tends to be proportional to its surface area, there is provided, for this and other reasons to be mentioned, a link having a high heat exchange value for its weight.

The weight is lessened and the surface area increased by the preferable design having the radially inward portion of the link with a greater outward taper than the radially outward portion. This provides as perhaps best seen in section a link with larger area for its weight than a uniformly tapering link would provide. The link is spoken of as providing in section a concave outward contour, on each side of the link.

Further the radial measure of the link annulus is as close to one half of the link aperture diameter as will allow the links to hang vertically and spaced links joined by the same link to turn relative to each other about a vertical axis. Thus preferably the radial extent of the link should be about 40% of the link aperture diameter.

(Not counted in the radial measurements or the aperture diameter are mold-created edges which will wear off early in use).

The chain link in accord with the invention preferably has a round inner surface, of a relatively large radius, in section to wear on other link surfaces, particularly the inner surface of the connected links. The link about the axially outward limits of such inner surface reaches its thickest axial dimension. From the axially thickest portion the link tapers in section in a radially outwards direction.

The taper in section thickness from the inside to the outside of the link is made greater on the radially inner portion so that, due to the change of taper, the section of the link is concave outward on each side of the link. Although this will increase the area and proportionately increase the heat exchange, (an advantage in itself) the reason this is done is primarily to reduce the weight of the link without reducing the radial extent.

The weight reduction is of great importance in rotary kiln chain, acting to reduce the load on the kiln bearings and external and internal fittings.

The area of the link as viewed in an axial direction forms the main barrier to gas travel in the kiln and hence the area that contributes mainly to heat exchange in the kiln. The maximum area for a chain made of similar links, viewed axially, is when the radial dimension of the link annulus is about 40% of the link diameter. (At over 50% of the link diameter, the link annular expanse would interfere, in a vertically hanging chain, with the other link passing through the same aperture).

With regard to the preferred chain link shape the round cross-section circular link shape currently used evolved because of the cost effectiveness of the chain manufacturing process in use. The round link chain was not engineered to optimize heat exchange while minimizing dust generation. In a rotary kiln, such as used in the manufacture of Portland Cement for example, heat exchange systems using chains are in common use. Because of the rotation of the kiln, the chains are caused to lift feed material (a fine powder) up into the gas stream. A percentage of this dust is carried out of the kiln by the kiln gases. The sensible heat contained in the dust is lost as the dust is collected in e.g. precipitators. The dust is either wasted or, at best, in part reintroduced into the kiln. For these reasons, it is important to minimize dust generation in rotary kilns. The inventive chain link preferably has approximately 1.4 $ft^2$ of surface area per foot of chain, while the round chain normally used has approximately 0.77 $ft^2$ of surface area per foot of chain. The inventive chain, therefore, reduces the amount entrained in the gas stream by approximately 45% since each inventive link will lift about the same amount of dust as one commonly used round link. The inventive link, due to its large projected area and flat shape creates considerable gas turbulence as the hot gases pass by the link, thereby optimizing heat absorption into the links.

It should be noted that the chains which most commonly will use the inventive link discussed this far are chains where continuous links and junction links alternate. Thus a continuous link will have the inventive section throughout its circumference. The junction link will have a main extent about the major portion of its circumference known as a C member having the inventive section and a bridging member of slightly different but largely similar section. Thus the advantages claimed for a continuous link will be largely true for a junction link.

The features so far discussed are suitable on kiln chains of several grades and kilns. Many of these may be welded so that every second link before assembly has a gap. Each gapped link may be linked with a pair of whole links and its gap welded shut to complete a chain.

Some chains may not be completed in this way because the link's material may not be welded without destroying its properties. Such material includes the alloys known as 'ductile iron' and 'white iron'. So called ductile iron, contains carbon nodules, which are spaced throughout the alloy to increase its ductility. The so-called ductility is only relative in that the alloy is a little bit more ductile than common chain link material. Such 'ductile iron' cannot be welded, because welding temperatures will destroy and disperse the carbon nodules, destroying the ductile qualities of the steel.

In accord with the invention a specially designed junction link is provided wherein the major extent being a C shaped member, preferably resembles in section and radius the continuous link previously discussed. There is a gap in the major extent circumference. On each side of the gap are bores. A bridging member to close the gap in the junction link has bores for respective alignment with those in the junction link. The bridging member interfits with the main extent and an outwardly facing cup is formed on at least one of a pair of aligned bores.

In a preferred method of forming the junction link a rivet-like member of weldable material has a shank with a head at one end and a free shank end at the other. In the inventive method the free end of a shank is inserted through each pair of aligned bores. At each set of aligned bores electric arc welding techniques are applied to the free end of the rivet-like member to cause melting of the free end so that the melted material flows to form a second head on the shank, the head being preferably shaped by the outwardly facing cup formed about the aligned bore. The cup is of course upwardly facing during the flow of the melted material. The surface of the cup may be protected by spray or mineral paper forming a heat protective layer.

In drawings which illustrate preferred embodiments of the invention.

Figure 1:
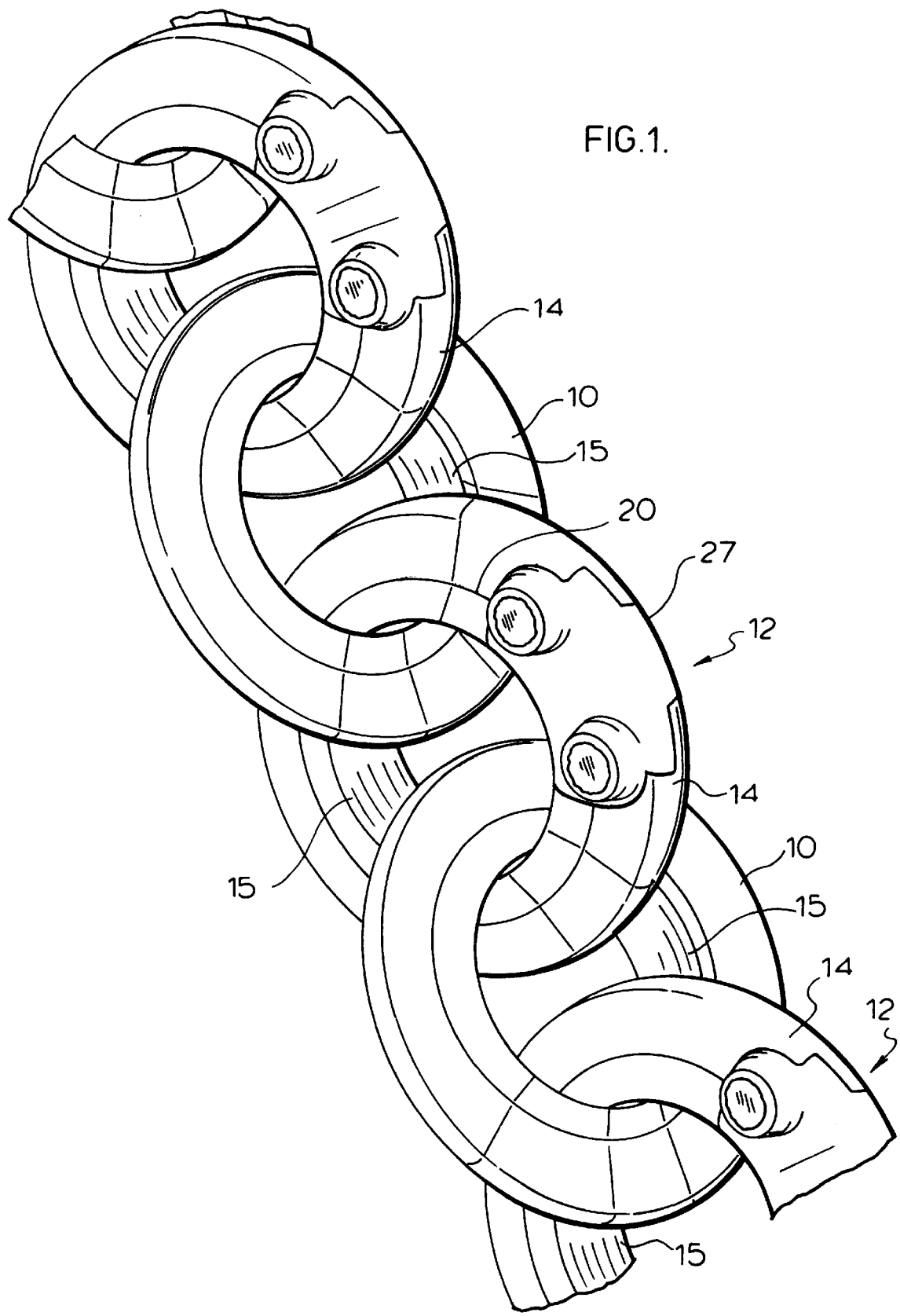
FIG. 1 shows a perspective view of a portion of a chain having alternating continuous links and junction links.
Figure 3:
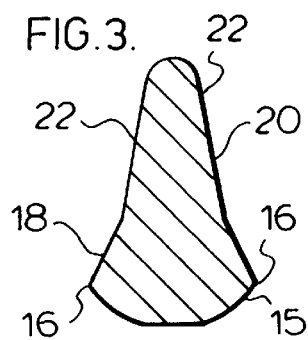
FIG. 3 is a section taken along the lines 3—3 of FIG. 2.

In the drawings, the continuous links 10 of ductile iron are shown in perspective in FIG. 1 and the preferred section of a continuous link 10 which is preferably a surface of revolution 10 is shown in FIG. 3 (being identical to the preferred section of a C member).

The terms 'axial' and 'radial' herein relate to the axis and radius of such surfaces of revolution in relation to a continuous link 10 and in relation to the axis and radius defined in C member 14 of the junction link 12.

Sections of the continuous link 10 shown in FIG. 3 correspond to a section of the C member 14 of the junction link 12 and elements in such sections bear the same numbers.

The inward surface 15 of a continuous link or C member borders the axially thickest part of the link. The link from lines 16 defining the edges of surface 15 then narrows outwardly along taper 18 to line 20 then narrows inwardly along a lesser taper 22.

The link has its best wearing qualities along wide inner surface 15. The inner surface 15 on one link will normally contact and wear corresponding surface 15 on each interlocked link.

Thus lightness in the design is contributed to by confining the main weight of the link to inner main wear areas 15 and making thinner the larger circumference material. The taper of course contributes to this and the change of taper at line 20 provides a section with a concave outward profile which reduces the weight and at the same time increases the surface area, both parameters increasing the ratio of surface area to weight. Hence the increased ratio of heat exchange value to weight being a measure of the efficiency of the link and chain.

The heat exchange value is of course the most important characteristic of the link since the chain's main purpose is to transfer the heat from the kiln gases to dry powdered material therein.

The relative lightness of the links and chain reduces the load on the kiln supports, rollers, bearings and fittings (not shown).

The efficiency of heat exchange in a kiln is also affected by the portion of the kiln cross section which is filled with chain. This is mainly influenced by the amount of a vertical chain height which is chain link. The maximum vertical area that a circular link chain can occupy is when the radial extent of the annulus is 50% the diameter of the inner opening.

However 50% of the diameter, this is not practically suitable since the slightest movement of a link interlocked with another, will cause clashing with the third link (the second interlocked link).

It is believed that the most efficient practical relationship is when the radial extent of the annulus is about 40% of the central opening diameter. That is, looking at FIG. 2, when dimension A is about 40% of dimension D.

Figure 2:
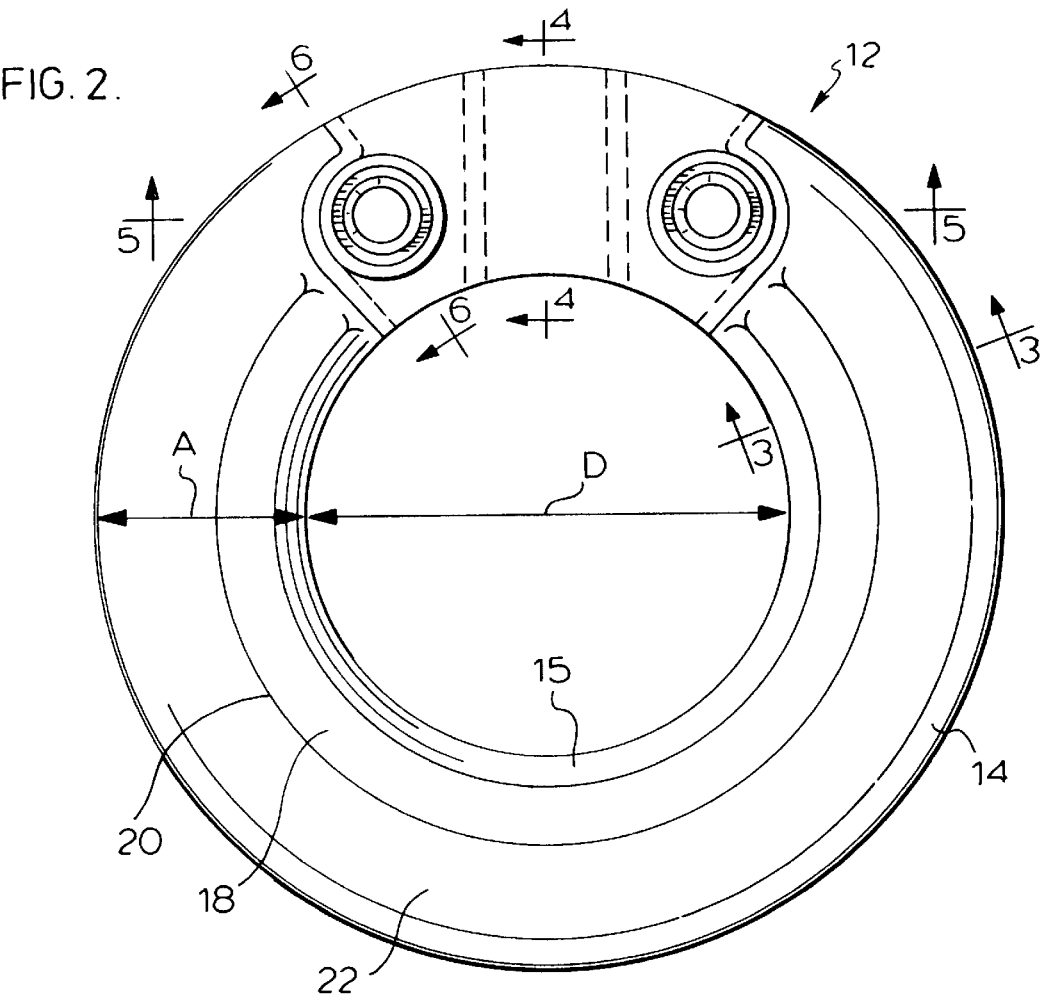
FIG. 2 shows a junction link including a C member having the same section as a continuous link.
Figure 5:
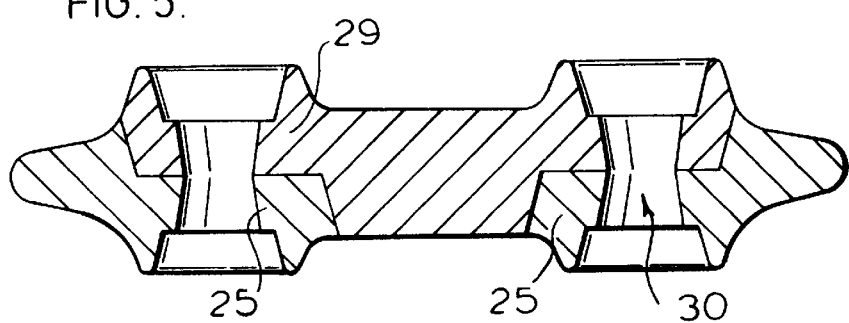
FIG. 5 is a section taken along the lines 5—5 of FIG. 2.
Figure 6:
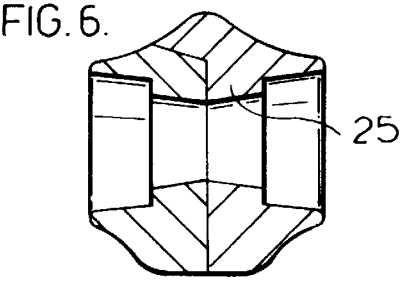
FIG. 6 is a section taken along the lines 6—6 of FIG. 2.

The junction link 12 as best shown in FIG. 2 with a C member 15 is, formed mainly of the profile of FIG. 3 but has particularly shaped junction ends as shown in FIG. 5, 6 and 2, shaped to complement surfaces on a bridging member 26.

Thus the majority of the circumference of main extent 14 of the junction link has a section with the same heat exchange advantages as the continuous link 10 and the bridging member of the link junction is designed to closely approach the sectional shape and the heat exchange advantages.

Figure 7:
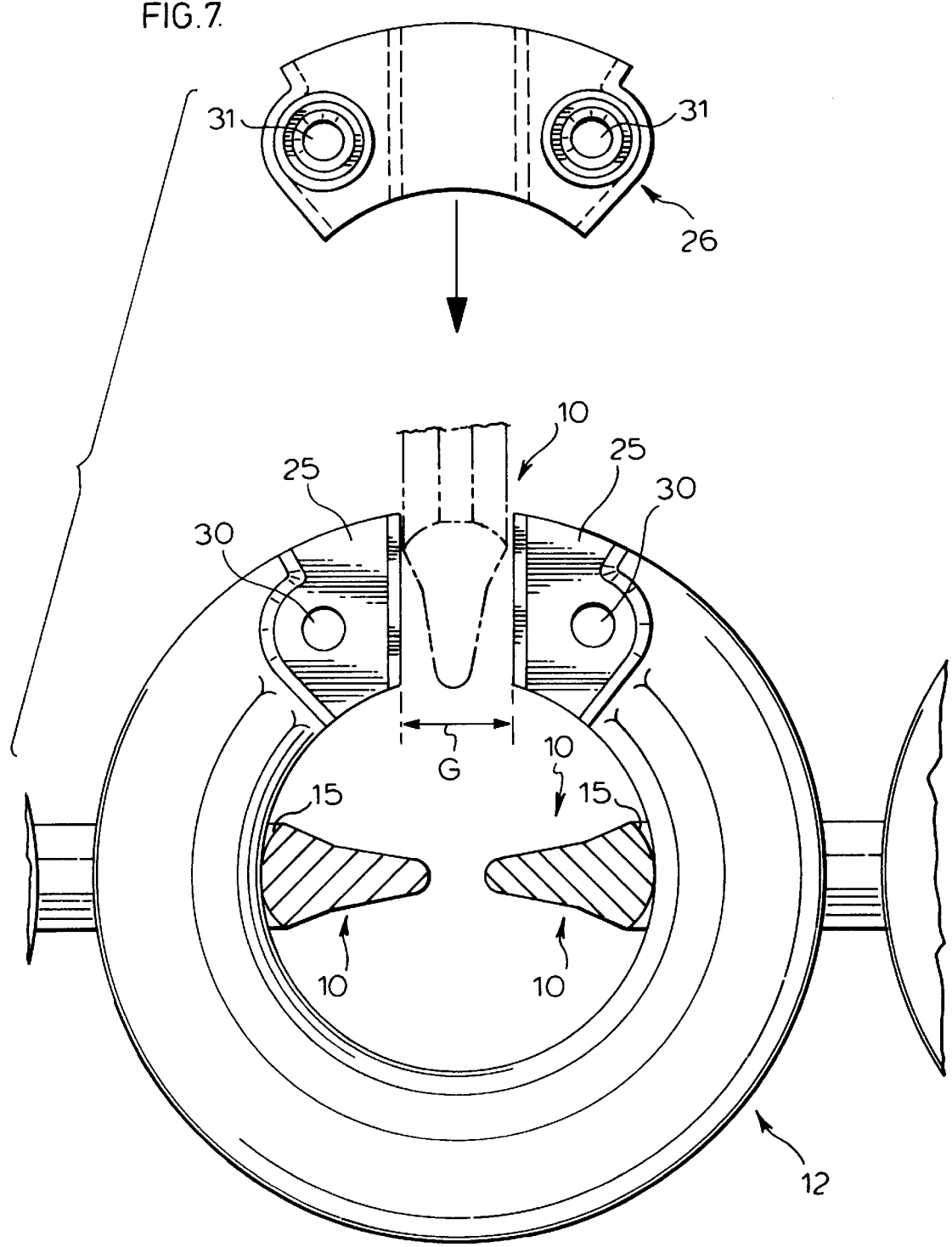
FIG. 7 is a schematic view relating to the relationship of a continuous links, a junction link, and a bridging member.

As best shown in FIG. 7 the junction link C member 14 provides openings 30 which respectively align with openings 31 at each end and adjacent said opening. At extent 25 member 14 has one half thickness measured in the axial direction. The gap G in the main extent 24 is wide enough for the insertion of a continuous link 10 as FIG. 7 is intended to demonstrate.

The bridging member 26 complements main extent 24 to supply the 'bridge' closing the junction link when the weld melted rivet-like members 28 are applied. The bridging member 26 joins the main extent 24 between the rivet-like members 28 and provides openings 31.

Figure 4:
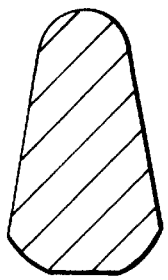
FIG. 4 is a section taken along the lines 4—4 of FIG. 2.

In the gap closed by the bridging member 26, the section is preferably as shown in FIG. 4 and has a single taper making it slightly stronger for its bridging function.

In the normal course with links of weldable material, a chain may be formed by providing a gap in every second link and, after connecting it with two continuous links, welding the gap closed.

However if the chain is composed of non-weldable materials, such as co-called 'ductile iron' or 'white iron' then the link material cannot be welded since the heat would destroy the desirable qualities of the alloy.

In accord with the invention, C member 14 in its half thickness extent 25 is provided with opening 30, located adjacent the gap. The bridging member 26 is similarly apertured in its half thickness extent 29 with openings 31 which align with openings 30 in assembled position. As FIGS. 8 and 9 demonstrate apertures 30 and 31 are each defined by an inner narrow bore and a wider outwardly facing bore 33 which connects to the inner bore by a ledge 35.

FIG. 7 shows the means for interlinking a continuous link 10 (shown in dotted outline) with the main extent 14 of a junction loop 12 by passing it inwardly (downwardly in the drawings) through gap G. When two continuous links 10 are interlinked with the junction link main extent 14, as also shown in FIG. 7, the bridging member 26 is applied and the combined bridging member and main extent are shown in plan in FIG. 2 and in section in FIG. 5.

To fasten the bridging member 26 in place (Figure *), a "rivet-like" member 28 with a head 39 and a shank 41, of weldable material, has its shank inserted through the aligned apertures of main extent and bridging member.

The direction of shank insertion should be upwardly. Thus it will be seen that the upwardly widening larger bore 33 in the bridging member 26 forms a cup about shank 41 when the head 39 rests upon the lower ledge 35.

The surface of the upper bore 33 may be covered with mineral paper or thermal protective spray to protect the bridging member 26 from welding heat.

Electric arc welding using a tungsten rod A with the complement welding terminal B attached to the bolt head, melts the free end of the shank, which flows into the 'cup' formed by tapering wall 33. The melted shank material forms a 'weld' material head for the free end of the shank and the C member and bridging member are thus attached.

During the above process, the whole 'rivet-like' member has been heated. As it cools it contracts and the C member and the bridging member are drawn firmly together.

The electric arc welding has been performed without damaging the ductile iron of the C member or the bridging member.

Figure 8:
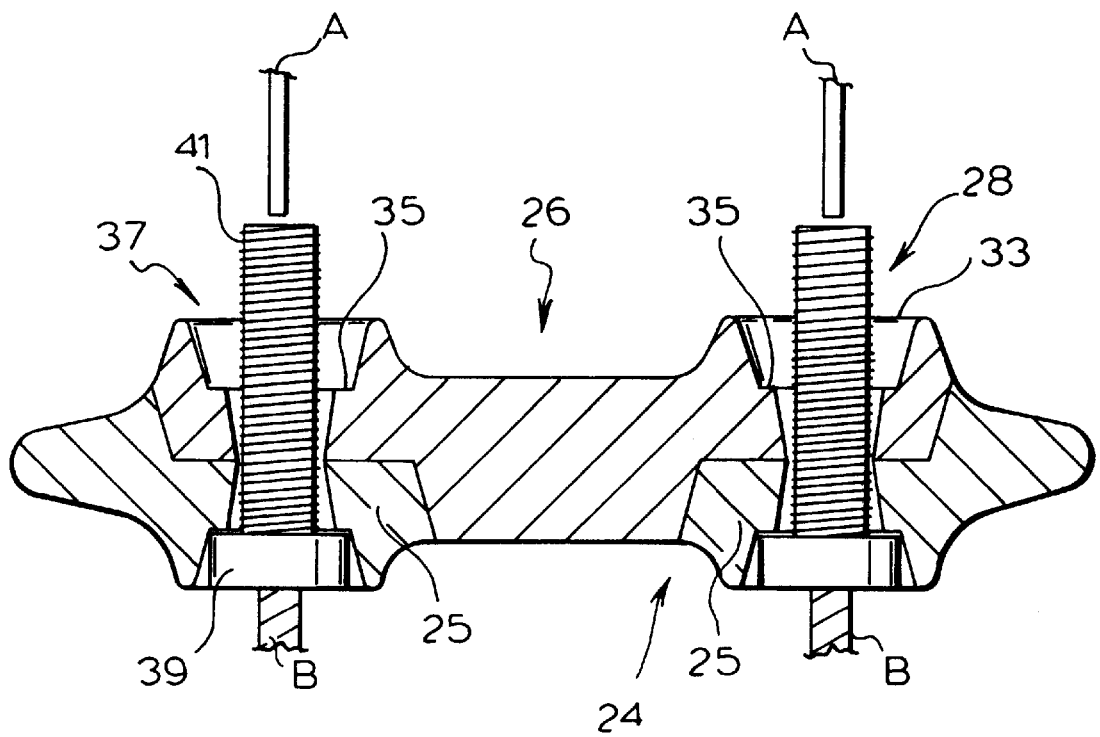
FIG. 8 is a view showing rivet-like members prior to welding together an associated C member and junction member.
Figure 9:
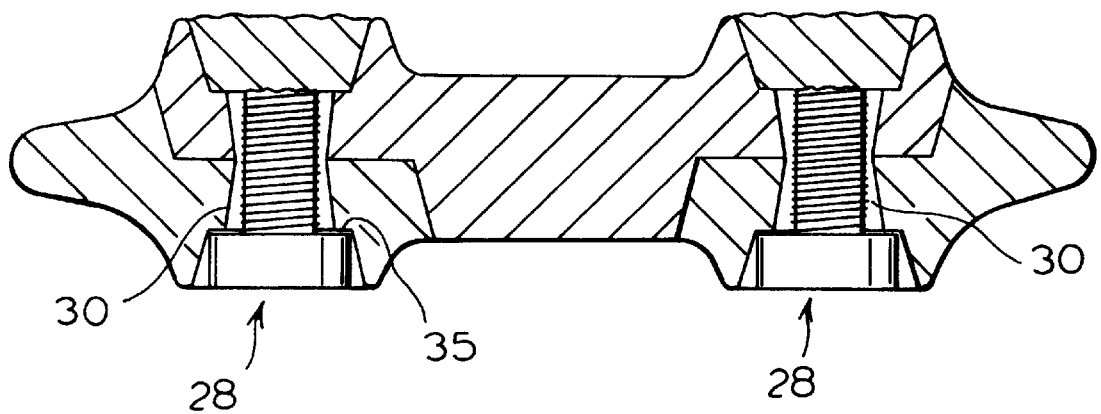
FIG. 9 shows the result of welding the rivet-like members after location as in FIG. 8.

It will be noted that the process described may be performed with the bridging member and C member inverted from their position in FIGS. 8 and 9 relative to the shank. In this case the upper free end 41 of the shank will again be melted to flow into the cup 33 formed in the C member, while the shank rests against the ledge 35 int he cup of the C member. The C member cup was again protected by a protective layer.

It will be noted that the process described above may start with an unheaded shank. The process may be performed with either free end of the shank formed on the then upper end of a shank projecting through aligned features, to form a cooled melted head. The bridging member, C member and shank, may then be inverted and the process performed as shown in FIGS. 8 and 9.

A rivet-like member without a pre-formed head may also be used. If such a headless rivet-like member is used the first head is formed as described above and then the still headless end threaded upwardly through the aligned apertures as described before the second head is formed as described above.

I claim:

1. Link of substantially circular shape for a rotary kiln chain, having an extent, extending about most of the circular shape of substantially uniform cross section, said extent defining a section wider at the inside than outside said section having opposite sides defining outwardly facing concavities, and said section defining a radial thickness and said link having a maximum axial thickness, said section defining a radial thickness greater than the link's maximum axial thickness.

2. Link as claimed in claim 1 forming substantially a surface of revolution.

3. Link of substantially circular shape for a rotary kiln chain, having an extent, extending about most of the circular shape, said circle defining link aperture and aperture diameter, said extent having a section wider at the inside than the outside, said section defining a radial thickness, said radial thickness being about 40% of said link aperture diameter.

4. Link as claimed in claim 3 forming substantially a surface of revolution.

5. Link of substantially circular shape defining an annulus radial extent and a central opening diameter when said radial extent is about 40% of the central opening diameter.

6. Link as claimed in claim 5 forming substantially a surface of revolution.

7. Link of substantially circular shape for a rotary kiln chain, having an extent, extending about most of said circular shape of substantially uniform cross section, said cross-section defining an inner contour, said extent defining an inner aperture, the radius of said inner aperture being substantially greater than the radius of said inner contour.

8. Link as claimed in claim 7 forming substantially a surface of revolution.

9. Link of substantially circular shape for a rotary kiln chain, having an extent, extending about most of said circle of substantially uniform cross section, said cross section defining a straight inner taper meeting a lesser straight outer taper whereby a concavity is defined where said tapers meet.

10. Link as claimed in claim 9 forming substantially a surface of revolution.

* * * * *